Patented July 11, 1939

2,165,554

UNITED STATES PATENT OFFICE 2,165,554

WHITE OPAQUE VITREOUS ENAMEL FRIT

Ignaz Kreidl, Vienna, Austria, assignor to the firm Vereinigte Chemische Fabriken Kreidl, Heller & Co. Nfg., Vienna, Germany, formerly Austria No Drawing. Application November 24, 1931, Serial No. 577,164. Renewed December 5, 1936. In Austria December 10, 1930

3 Claims. (Cl. 106—36.2)

This invention relates to an enamel frit for the production of iron enamels.

The present invention is based on the observation that enamel frits (that is the fused enamel mass) can be brought, by chemical influences as particularly by suitable composition of the enamel mass that is by suitably varying the ratios of the constituents of the enamel mixture or one or more of the constituents themselves or both, into a colloidal form in the slip, or into an approximately, finely divided condition, and that this form offers great advantages for enamelling iron, particularly for the production of an opaque white enamel. Such frits, in which the colloidal or finely divided form is attained quite independently of the grinding, differ substantially from the enamel frits that are brought into a fine state of distribution approximating to the colloidal state by mechanical means, that is by grinding in colloid mills, it being known that the extensive grinding required to produce the colloid state impairs the ready applicability of the enamel slip (that is its capability of being applied to the objects to be enamelled) and is the cause of other inconveniences such as the cracking of the enamel.

The employment of frits according to the present invention, which in the slip are in a colloidal, or approximately colloidal state brought about by chemical treatment followed by mechanical or physical treatment, is accompanied by the advantage of increasing the applicability of the slip, and the further advantage that, in firing, such enamels are less liable to crack and are not so sensitive when overfired, as enamel masses of ordinary character and composition.

That condition of the frit which corresponds to the invention can also be favoured by a "resting" process, preferably at elevated temperature.

Such an enamel slip which is directly in a plastic condition also enables the amount of plasticising agents, such as clay or the like required to be added to the slip, on the mill, to be reduced, or sometimes omitted altogether.

The change of character of the enamel frit is effected in accordance with the invention by modifying its chemical composition or by varying the ratios of the constituents of the enamel mixture or both.

The invention is based on the observation that a frit which becomes colloidal in the slip, even in the case of ordinary grinding, can be obtained either by increasing the amount or the addition of substances containing fluorine to the enamel batch, that is, to the unmelted crude mixture, and that the colloidal character of the frit in the enamel slip increases with the fluorine content, or by varying the ratio of alkali to boric acid in such a manner that it is higher than in the usual enamel batches or by doing both.

In carrying out the process according to the invention it is advantageous simultaneously to increase the aluminium content and therefore preferably the addition of clay, felspar or the like, to the crude mixture.

The attainment of the colloidal condition of the slip and the most favourable composition for that condition, can be ascertained in each case, by testing the slip by the known methods employed in colloidal chemistry. Thus, for example, this condition for the process of the present invention is attained and is outwardly conspicuous when the enamel, ground on the mill with water in the usual way, does not settle out, even without addition of clay.

In enamel frits in which the colloidal state is attained by increasing the content of fluorine, the colloidal character is greater, the higher the content of fluorine is. The optimum condition is attained with a fluorine content far in excess of that in the normal enamel batches (i. e. containing about 5% of fluorine), and the effect is the better the larger the content of fluorine. Nevertheless, natural limits are imposed on the fluorine content, in that the fusibility of the enamel, the coefficient of expansion, the gloss and the like, must not be adversely affected.

Thus, enamel masses containing up to 10–12% of fluorine are suitable for the process according to the invention.

It is, however, essential that the increase in the fluorine content beyond that of normal enamel batches should not be obtained by increasing the cryolite content. The invention is based on the observation that the increased fluorine content must be obtained by the addition of fluorine-bearing substances other than cryolite. Of such substances—on which the invention is also based—the addition of alkali fluosilicates (such as sodium fluosilicate), alone or in conjunction with clay, has been found suitable.

In the case of such frits, high in fluorine, it is, however, essential that the fusion or melting process of the constituents of the enamel mass in the preparation of the frits, or the fritting of the raw materials, should not be protracted or conducted at unduly high temperature, or the desired result will be impaired apparently through the volatilisation of the fluorine.

According to the present invention, such a frit that is colloidal in the slip, or is at least in a state of fine division approximately corresponding to that condition, can be also obtained by employing an enamel batch in which the ratio of alkali to boric acid is considerably higher than in the usual enamel batches. This can be accomplished by reducing the boric acid content, or by increasing the content of alkali, though preferably by a combination of both measures, that is, by lowering the boric acid content, and at the same time, increasing the alkali content. In such case, the larger amount of alkali can be introduced in the form of any of the usual alkali-bearing raw materials employed for the preparation of enamels, such as sodium carbonate, felspar and the like, but not cryolite.

In most of the usual enamel batches, the average ratio of alkali to boric acid may be regarded as about 1.5 parts of alkali to 1 of boric acid. The minimum limit furnishing an enamel frit which becomes colloidal in the slip may be taken as over 2 parts of alkali to 1 of boric acid. The preferable ratio of alkali to boric acid for an enamel frit according to the present invention is between 3:1 and 5:1, in which the alkali content of any alkali-containing fluorine compound that may be added, is not to be included.

It is also advantageous to increase the aluminium content, and therefore the addition of clay, felspar or the like, to the crude mixture.

Consequently, for example, the ratio of alkali to boric acid must be modified until that condition is attained.

*Examples*

1. Example of a frit which is brought into a colloidal state in the slip by increasing the content of fluorine in the unmelted crude mixture. The following enamel mixture is fritted:

| | Grams |
|---|---|
| Borax approximately | 24.6 |
| Sodium carbonate do | 3.2 |
| Potassium nitrate do | 4.2 |
| Calc spar (calcium carbonate) do | 1.6 |
| Sodium fluosilicate do | 20.0 |
| Feldspar do | 24.6 |
| Kaolin do | 2.1 |
| Quartz do | 25.7 |
| | 106.0 |

1000 grams of this frit are ground, in the ordinary manner, with 500 grams of water, 20 grams of clay and a clouding agent such as 0.2 gram of methylene blue. It is then applied on the objects to be enamelled and fired in the usual way.

Methylene blue may also be replaced by any other agent producing opacity by the evolution of gas, such as oxalic acid, formic acid and the like, in corresponding amount, or by a solid clouding agent, such as 60 grams of one containing zirconium oxide.

2. Example of a frit which is brought into a colloidal state in the slip by increasing the ratio of alkali to boric acid to an amount surpassing 2:1.

| | Grams |
|---|---|
| Borax approximately | 15.0 |
| Feldspar do | 34.0 |
| Quartz do | 20.0 |
| Sodium fluosilicate do | 12.0 |
| Fluorspar do | 2.1 |
| Sodium carbonate do | 20.8 |
| Potassium nitrate do | 3.0 |
| Kaolin do | 6.2 |

In this example the larger amount of alkali is introduced in the mixture in the form of sodium carbonate.

3. Example of a frit which is brought into a colloidal state in the slip by increasing both the content of fluorine and the ratio of alkali to boric acid.

In the Example 2 the content of sodium fluosilicate is increased to approximately 15 grams.

What I claim is:

1. A vitreous enamel frit made from cryolite free raw materials containing silicates, borates, alkali metal compounds and fluorides, the latter being introduced into the raw mixture by means of a fluosilicate, so as to furnish about 10% to 12% fluorine by weight of the total weight of the said raw mixture, and the ratio of alkali (that is $Na_2O$ or $K_2O$) to boric acid being substantially greater than 1½ parts of alkali to one part of boric acid, excluding the alkali content of the fluorine compounds, whereby the said frit is rendered suspendible in water with a minimum amount of clay addition and without excessive grinding.

2. Vitreous enamel frit suitable for the production of opaque enamel on sheet iron, containing silicates, borates and fluorides, the fluorine content of the raw unfused frit amounting to about 10% to 12% by weight, at least half of which content is supplied by a fluorine compound other than cryolite, and in which raw frit the weight ratio of alkali metal oxide calculated as $Na_2O$ to borate, calculated as boric acid, is substantially greater than one and one-half, the said calculations excluding the alkali metal content of any fluorine compound.

3. A vitreous enamel frit suitable for the production of opaque white enamel on iron, containing silicates, borates, and fluorine compounds and an alkali metal compound, that part of the fluorine content of the raw unfused frit being supplied by a fluorine compound other than cryolite being at least 5%, and the weight ratio of alkali expressed as $Na_2O$, excluding the alkali metal content of any fluorine compound, to boric acid being substantially greater than one and one-half, and which frit when ground in the usual manner and mixed with water forms a stable suspension even in the absence of clay.

IGNAZ KREIDL.